US 6,713,926 B2

(12) United States Patent
Wauke (10) Patent No.: US 6,713,926 B2
(45) Date of Patent: Mar. 30, 2004

(54) THIN AND LIGHTWEIGHT INNER ROTOR MOTOR AND DISK UNIT USING THE SAME

(75) Inventor: Tomokuni Wauke, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/075,159

(22) Filed: Feb. 14, 2002

(65) Prior Publication Data

US 2002/0117925 A1 Aug. 29, 2002

(30) Foreign Application Priority Data

Feb. 23, 2001 (JP) ........................................ 2001-049347

(51) Int. Cl.⁷ ................................................. H02K 1/00
(52) U.S. Cl. ....................... 310/185; 310/185; 310/158; 310/156.35
(58) Field of Search ................................ 310/185, 156, 310/158, 154, 35–36

(56) References Cited

U.S. PATENT DOCUMENTS 4,983,867 A * 1/1991 Sakamoto ..................... 310/49
5,166,567 A * 11/1992 Kneiseley ..................... 310/216
5,260,620 A * 11/1993 Morrill ......................... 310/216
5,418,416 A   5/1995 Müller ......................... 310/186
5,818,140 A * 10/1998 Vagati .......................... 310/185
6,247,906 B1 * 6/2001 Pijanowski .................. 417/410
6,462,451 B1 * 10/2002 Kimura et al. .............. 310/156

FOREIGN PATENT DOCUMENTS

JP            4-178161         6/1992

* cited by examiner

*Primary Examiner*—Tran Nguyen
*Assistant Examiner*—Iraj A. Mohandesi
(74) *Attorney, Agent, or Firm*—Brinks Hofer Gilson & Lione

(57) ABSTRACT

There are provided a rotor having plural magnetic poles disposed in a circumferential shape, and a stator including a stator core having plural magnetic pole teeth that are outside a circumference of the rotor and face the rotor, a coil being wound around each of the magnetic pole teeth, wherein the stator is provided in a range within 180 degrees with respect to a center of the rotor, the magnetic pole teeth are set so that the value of at least one of angles each formed by extensions of adjacent magnetic pole teeth is smaller than an angle formed by lines each connecting a tip center of one of adjacent magnetic pole teeth and a rotation center of the rotor.

8 Claims, 10 Drawing Sheets

THIN AND LIGHTWEIGHT INNER ROTOR MOTOR AND DISK UNIT USING THE SAME

BACKGROUND OF THE INVENTION

1. Field of the Invention

The present invention relates to technology suitably used for a thin inner rotor motor for medium rotation driving used in, e.g., a floppy disk drive and the like.

2. Description of the Prior Art

Figure 10:
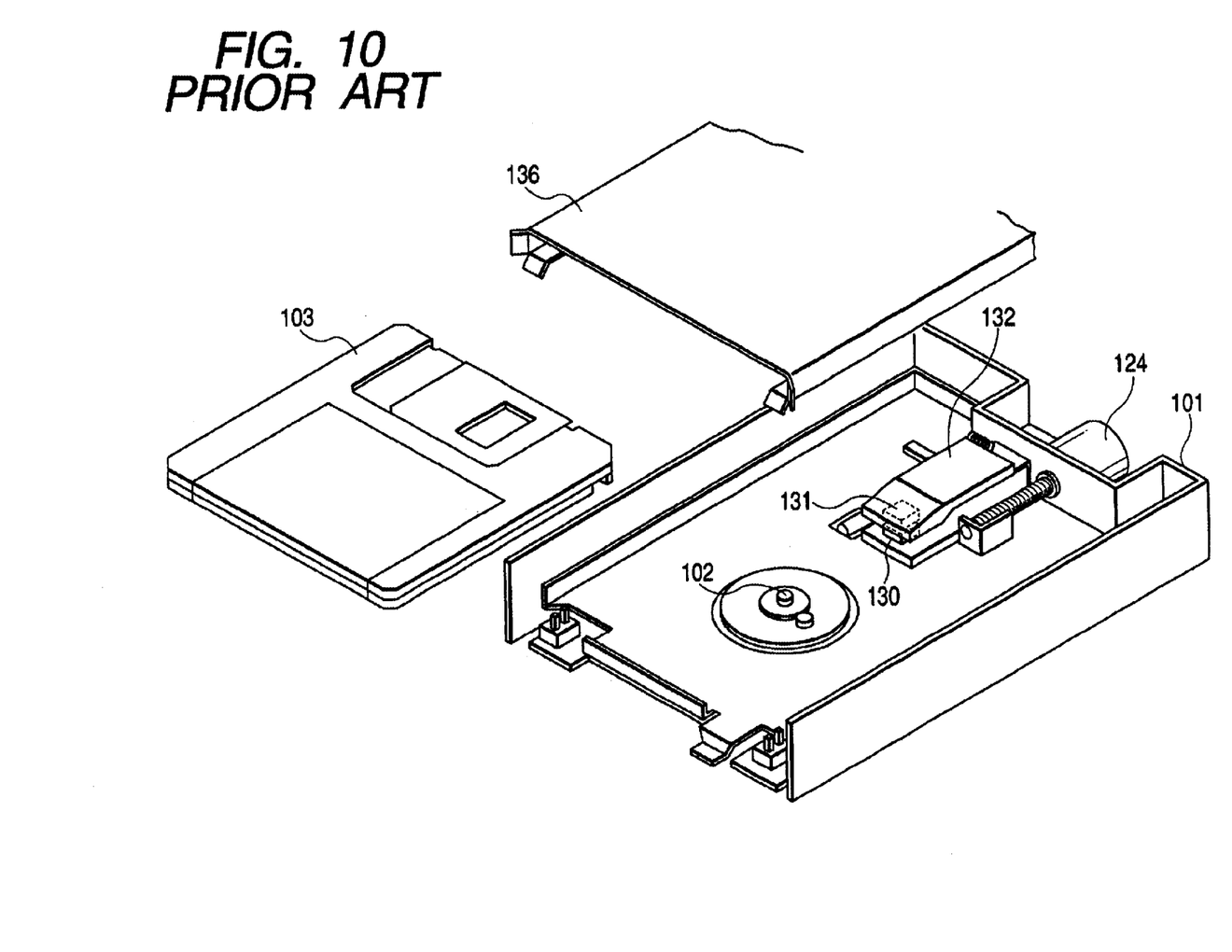
FIG. 10 is a schematic perspective view showing a conventional disk unit.

Disk units such as floppy disk drives are in wide use with personal computers, office computers, and word processors, and are becoming remarkably widespread. This type of disk unit is constructed as shown in FIG. 10.

This type of disk unit is described briefly with reference to the drawing. In the drawing, the reference numeral 101 designates a chassis having a spindle center 102 as a disk rotation center thereof, which is housed in an equipment housing (not shown) of, e.g., personal computer, and is formed by a closed-end box that is open in forward and upward directions as a whole and has a housing space for housing a disk cartridge 103.

In a rearward portion of the chassis 101 are provided a stepping motor 124 for feeding a head carriage and the head carriage shuttled back and forth by the stepping motor 124. At the tip of the head carriage is held a first head 130 for reading recorded information from disk, and at a backward, upper portion of the head carriage is provided a head arm 132 having a second head 131 corresponding to the first head 130, the head arm 132 being swingably mounted through an elastic member. The head arm 132 is energized in a direction in which the second head 131 approaches the first head 130. The disk unit of this example is provided with a cartridge holder 136 for holding the disk cartridge 103 that can be freely inserted or removed, and a mechanism for opening and closing a shutter of the disk cartridge 103.

Figure 11A:
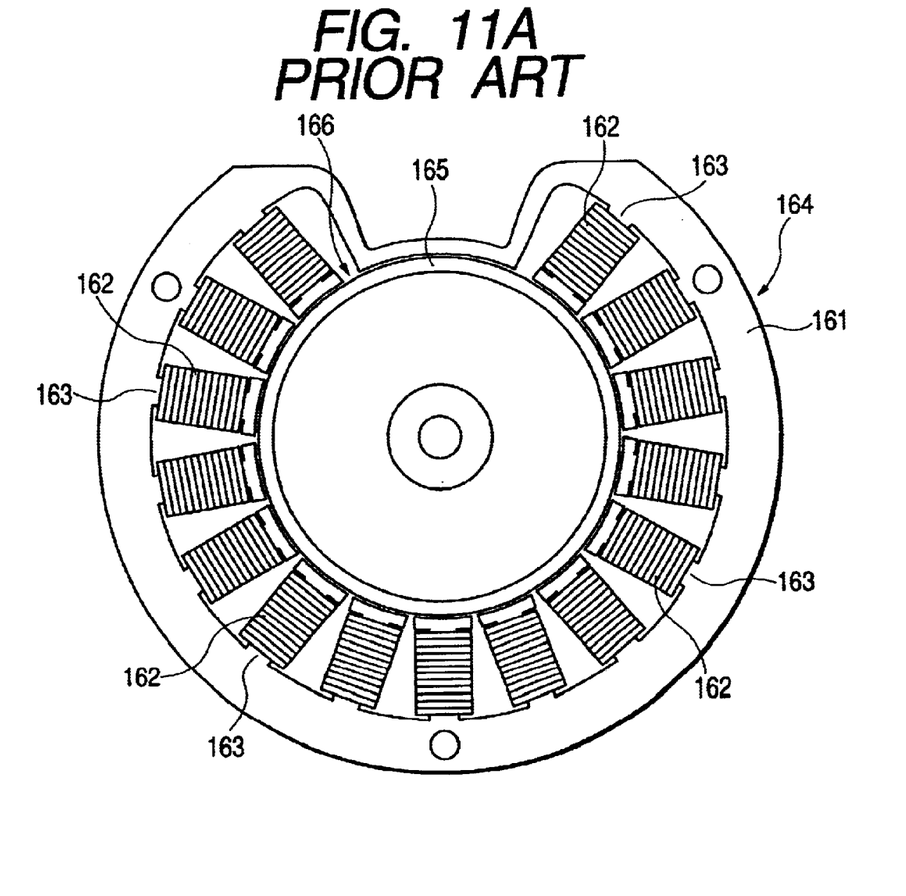
FIG. 11A is a plan view showing an conventional inner rotor motor.
Figure 11B:
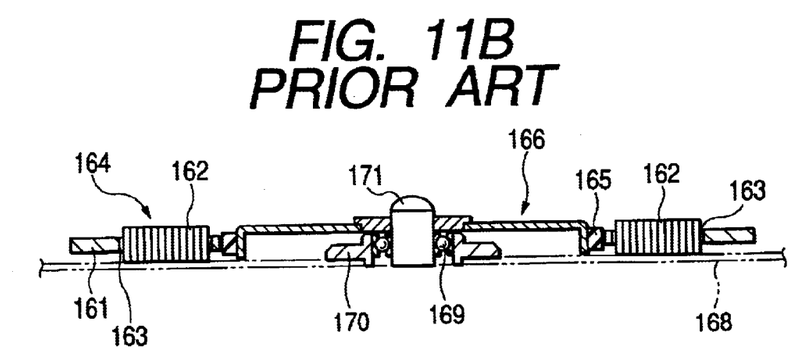
FIG. 11B is a cross section view of the same.

This type of disk unit is equipped with an inner rotor motor as shown in FIGS. 11A and 11B as a motor for rotating disk to meet recent demands for thinner disk units.

This comprises: an annular yoke 161 extending in a circumferential direction; a stator 164 having a large number of cores 163, provided radially in the inner circumference of the yoke 161, around each of which a coil 162 is wound; and a rotor 166 having an annular magnet 165 that is rotatably provided in the inner circumference of the stator 164 and faces the cores 163. The reference numeral 168 in the drawing designates a circuit board on which a holding part 170 incorporating a bearing 169 is mounted, and 171 designates a rotation axis for securing the rotor that is rotatably supported to the holding part 170 on the circuit board through the bearing 169 and extends vertically. The rotor 166 of the inner rotor motor functions as a turn table having a disk chucking magnet (not shown) and a disk chucking rotation lever (not shown).

In the inner rotor motor stator of this type, the yoke 161 and the cores 163 are provided to surround the almost entire circumference of the circular rotor 166 except the movement position of the heads 130 and 131. To satisfy the magnetic properties and other requirements, more expensive silicon steel plate than a galvanized steel plate is used to form the chassis 101 and other components.

However, for this type of disk unit, there have been a continued demand to reduce its manufacturing costs and a persistent demand to reduce the unit in size and weight.

For this reason, the inventor believes that there has been in an inner rotor motor stator a demand to reduce the space of the yoke 161 and the cores 163 that are made of expensive silicon iron.

However, if the space of the yoke 161 and the cores 163 is reduced to satisfy the above-described demand, magnetic interaction with the rotor 166 might become uneven in the circumferential direction and disk operation might become unstable.

Also, to reduce the space of the cores 163, the stator might be partitioned to have three cores. In this case, since the cores are often provided in parallel to each other, the interval between the tips of the cores would become too narrow, causing the problem that coils could not be wound.

SUMMARY OF THE INVENTION

The present invention has been made in view of the above circumstances and intends to achieve the following objects:
(a) reducing manufacturing costs;
(b) reducing the unit in size and weight;
(c) keeping motor rotation stable;
(d) increasing the operation stability of the disk unit; and
(e) pushing forward with reduction in stator size.

The above-described problems have been solved by an inner rotor motor of the present invention comprising: a rotor having plural magnetic poles disposed in a circumferential shape; and a stator including a stator core having plural magnetic pole teeth that are outside a circumference of the rotor and face the rotor, a coil being wound around each of the magnetic pole teeth, wherein the magnetic pole teeth are set so that the value of at least one of angles each formed by extensions of adjacent magnetic pole teeth is smaller than an angle formed by lines each connecting a tip center of one of adjacent magnetic pole teeth and a rotation center of the rotor.

In the present invention, the magnetic pole teeth may also be provided so that at least one of points of intersection of extensions of lines each connecting a base center and a tip center of one of adjacent magnetic pole teeth is in a position opposite to the magnetic pole teeth with respect to the rotation center of the rotor.

The magnetic pole teeth of the present invention can be placed so that extensions of lines each connecting a base center and a tip center thereof intersect at an identical point.

In the present invention, it is desirable that the magnetic pole teeth are provided so that intervals between the base centers of adjacent magnetic pole teeth are equal to each other.

Base centers of the magnetic pole teeth can be provided to be at an equal distance from a point opposite to the magnetic pole teeth with respect to the rotation center of the rotor.

In the present invention, it is desirable that the magnetic pole teeth are provided so that a value of at least one of angles each formed by extensions of adjacent magnetic pole teeth is 15 degrees or less.

It is desirable that the stator of the present invention is provided so that a central angle of the rotor with respect to the stator is in a range within 180 degrees.

Furthermore, it is desirable that six of the magnetic pole teeth are provided.

The disk unit of the present invention may include the above-described inner rotor motor.

In the present invention, the magnetic pole teeth are set so that the value of at least one of angles each formed by extensions of adjacent magnetic pole teeth is smaller than an angle formed by lines each connecting the tip center (tip center position) of one of adjacent magnetic pole teeth and the rotation center of the rotor. With this construction, in comparison with the case where magnetic pole teeth are provided radially from the rotor center as shown in FIG. 11, the interval between the adjacent magnetic pole teeth is reduced, and the space of yoke to which the magnetic pole teeth are connected is reduced, especially miniaturizing the stator and contributing to reduction in manufacturing costs.

The magnetic pole teeth are provided so that at least one of points of intersection of extensions of lines each connecting the base center and tip center of one of adjacent magnetic pole teeth is in a position opposite to the magnetic pole teeth with respect to the rotation center of the rotor. With this construction, it can be prevented that coils cannot be wound because of too small an interval between adjacent magnetic pole teeth.

Herein, the base center refers to the central position of a portion to which a magnetic pole tooth is connected to the yoke, in the circumferential direction of the rotor, and the tip center refers to the central position of a magnetic pole teeth face (rotor facing face) opposite to the rotor in the circumferential direction of the rotor.

The magnetic pole teeth of the present invention are placed so that extensions of lines each connecting the base center and tip center thereof intersect at an identical point. With this construction, the shape of the magnetic pole teeth can be set to be line-symmetrical with a line connecting the intersection point and the rotation center of the rotor. Thereby, in accordance with the magnetic pole teeth tip centers equally placed in the circumferential direction of the rotor, the stator can be made smaller and the interval between the magnetic pole teeth can be set so that coils can be wound.

In the present invention, the magnetic pole teeth are provided so that the intervals between the base centers of adjacent magnetic pole teeth are equal to each other. With this construction, the magnetic pole teeth can be made symmetrical with respect to a point of intersection of extensions of lines each connecting the base center and the tip center. Thereby, in accordance with the magnetic pole teeth tip centers equally placed in the circumferential direction of the rotor, the stator can be made smaller and the interval between the magnetic pole teeth can be set so that coils can be wound.

The base centers of the magnetic pole teeth are provided to be at an equal distance from a point opposite to the magnetic pole teeth with respect to the rotation center of the rotor. With this construction, the yoke to which the magnetic pole teeth are connected can be shaped to a simple arc, contributing to reduction in manufacturing costs.

In the present invention, the magnetic pole teeth are provided so that the value of at least one of angles each formed by extensions of adjacent magnetic pole teeth is 15 degrees or less. With this construction, the stator can be miniaturized, and especially the dimension of the yoke at each end thereof can be reduced, with the result that the amount of material such as silicon iron can be reduced, contributing to reduction in manufacturing costs.

The magnetic pole teeth of the present invention are provided so that angles formed by lines each connecting the tip center of one of adjacent magnetic pole teeth and the rotation center of the rotor are smaller than central angles at the rotation center of the rotor with respect to adjacent magnetic poles of the rotor. With this construction, the dimension of the stator core when viewed on a plan view can be reduced.

In the present invention, since the stator is disposed so that a central angle of the rotor with respect to the stator is in a range within 180 degrees, in comparison with the case where a stator is provided in the entire circumference of a rotor as in a conventional inner rotor motor, the space of a stator core can be reduced more than half. Therefore, the cost of stator core constructed from, e.g., silicon steel plate and the cost of coil windings can be reduced and the cost of manufacturing an inner rotor motor can be reduced. At the same time, in comparison with the case where a stator is provided in the entire circumference of a rotor, a space required to mounting a motor can be reduced to miniaturize the inner rotor motor, and the number of magnetic pole teeth can be reduced to reduce its weight. In addition to a stator placed within a continuous central angle of 180 degrees or less, plural stators may be placed discretely if the sum of corresponding central angles is within 180 degrees. If the stator is placed within a central angle of the rotor of 90 degrees or less, manufacturing costs, weight, and size can be further reduced.

In the present invention, six of the magnetic pole teeth can be provided to accommodate three-phase inner rotor motors.

DESCRIPTION OF PREFERRED EMBODIMENTS

Hereinafter, a preferred embodiment of an inner rotor motor and a disk unit using it will be described with reference to the accompanying drawings.

Figure 1:
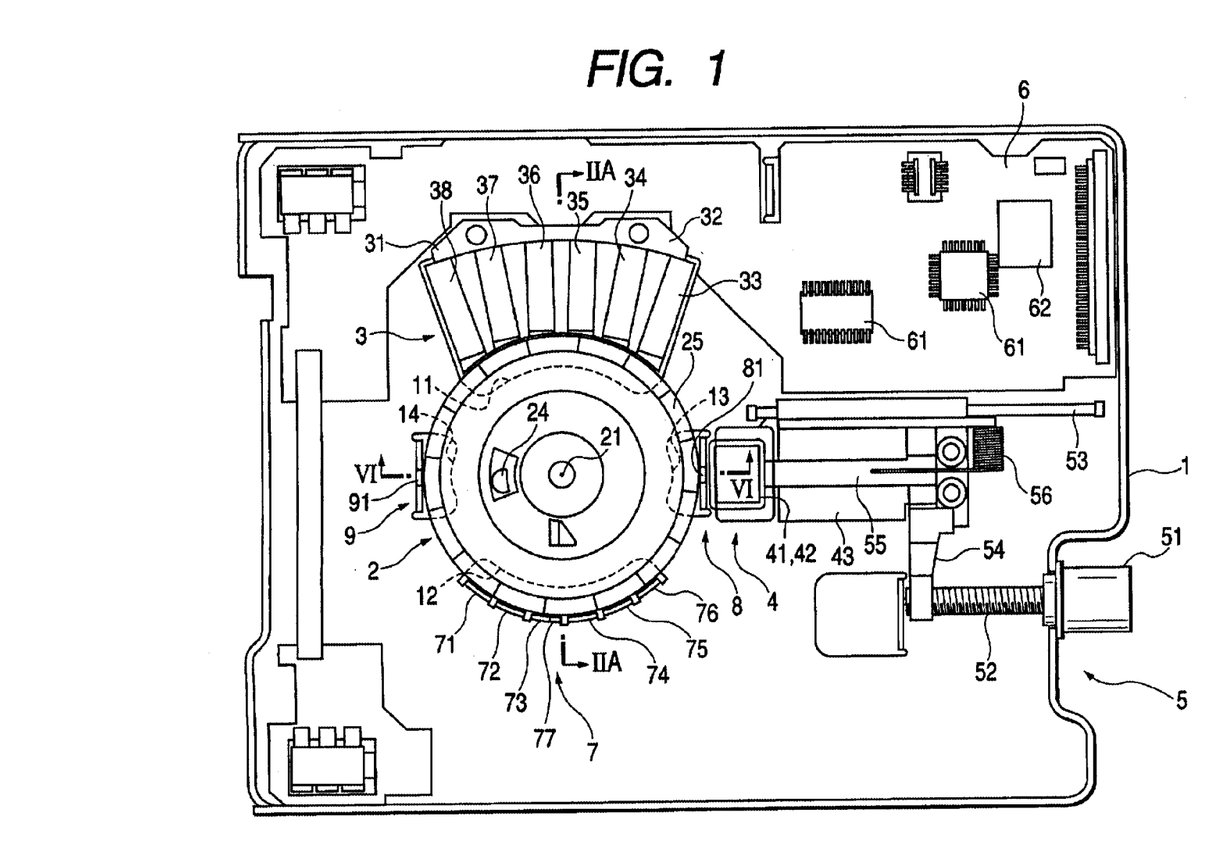
FIG. 1 is a plan view showing a preferred embodiment of an inner rotor and a disk unit of the present embodiment.

FIG. 1 is a plan view showing a part of a disk unit of the present embodiment. In the drawing, the reference numeral 1 designates a chassis constituting a part of a housing of the disk unit.

The disk unit of the present embodiment is an example of a disk unit used as a floppy disk drive (FDD: Floppy Disk Drive). On a chassis 1 constructed from a galvanized steel plate are disposed as shown FIG. 1: a rotor 2 and a stator 3 in an inner rotor motor rotating a magnetic recording medium (disk); a magnetic head 4 for reading and writing magnetic signals from the disk; a position controller 5 for conducting position control of the magnetic head 4; a board 6 as a controller for conducting driving control of the position controller 5 and the inner rotor motor; a magnetic balancer 7; a magnetic shield 8; and a magnetic balancer 9.

Figure 2A:
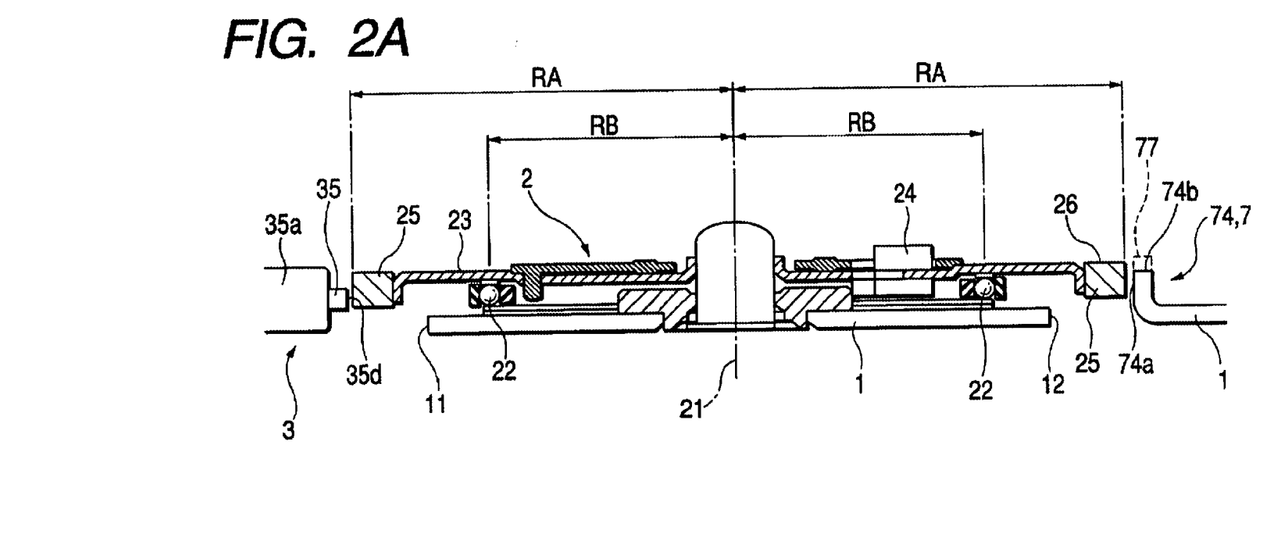
FIG. 2A is a diagram showing a cross section of the inner rotor motor of FIG. 1, taken along the line IIA—IIA.
Figure 2B:
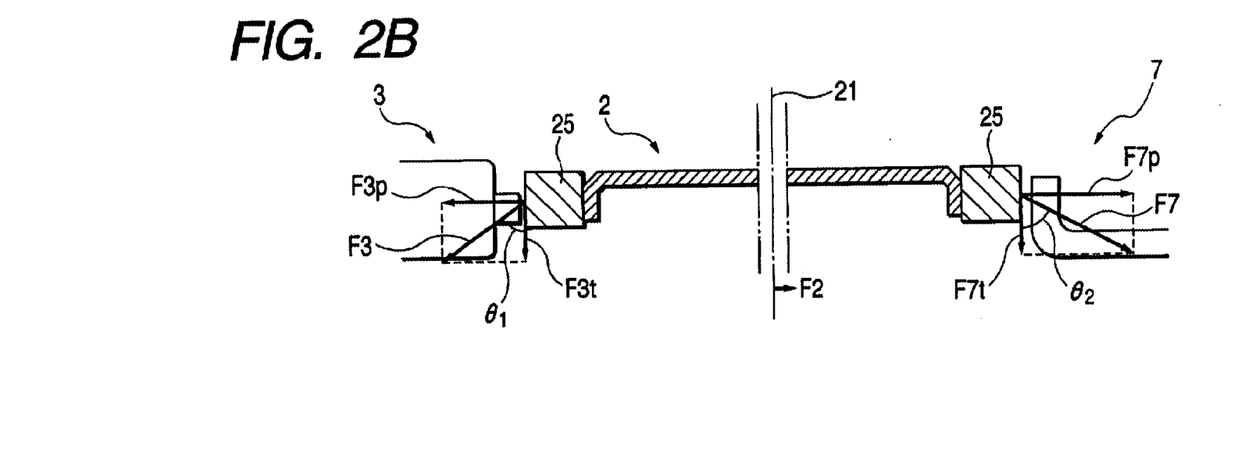
FIG. 2B is an enlarged section view showing the vicinity of magnet 25 in FIG. 2A.

FIG. 2A is a diagram showing a cross section of the inner rotor motor of FIG. 1, taken along the line IIA—IIA. FIG. 2B is an enlarged section view showing the vicinity of magnet 25 in FIG. 2A.

The rotor 2 comprises, as shown in FIGS. 1 and 2: a disc 23 rotatably supported along a face parallel to the bottom face of the chassis 1 by ball bearings 22 and the like with a spindle center 21 secured to the bottom of the chassis 1 as a rotation center; an engagement projection 24 that projects to the upper face of the disc 23 and engages with an engagement hole of a floppy disk to transmit a rotation driving force; and a thick magnet 25 that is disposed at the edge of the disc 23 and magnetized to form plural magnetic poles in a circumferential shape.

Figure 5:
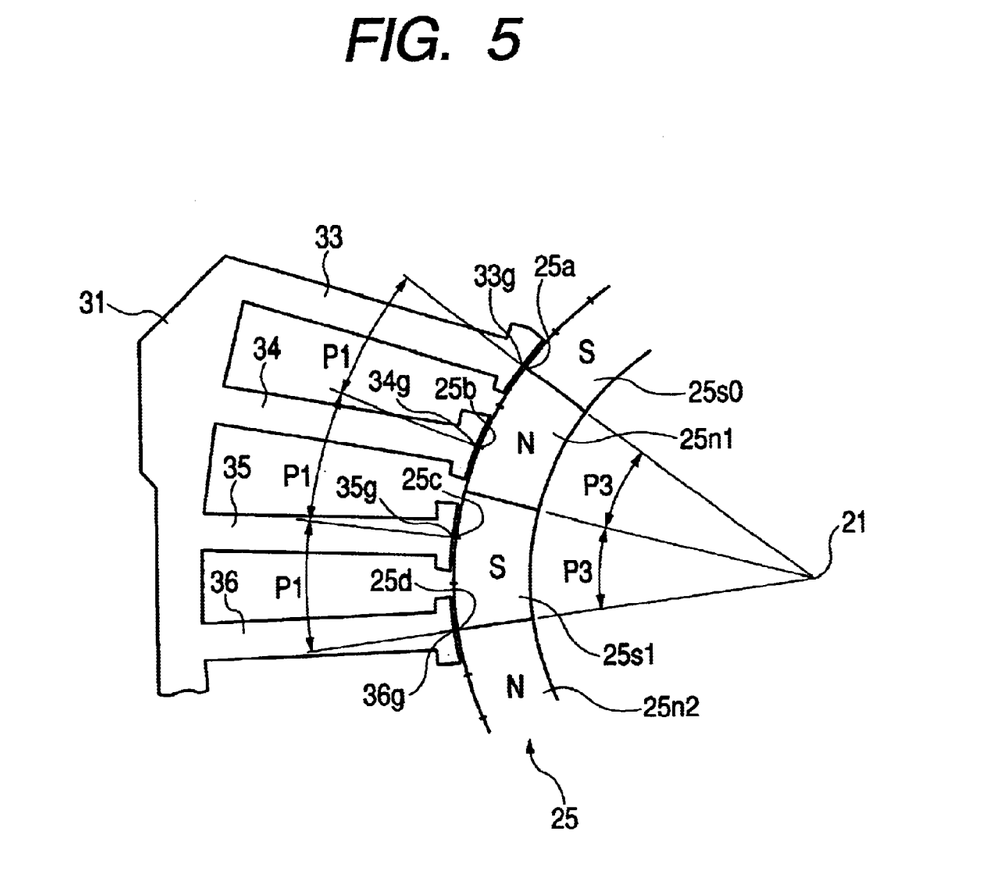
FIG. 5 is a schematic plan view showing a relationship between the magnet 25 and magnetic pole teeth 33 to 38 in FIG. 1.

In the magnet 25, as shown in FIGS. 1 and 5, the north pole and the south pole are alternately disposed in a circumferential direction so that, for example, a total of 16 poles are formed. In other words, magnetic poles 25*n*, 25*s*, and so forth are alternately disposed by 22.5 degrees with respect to the rotation center 21.

Figure 3:
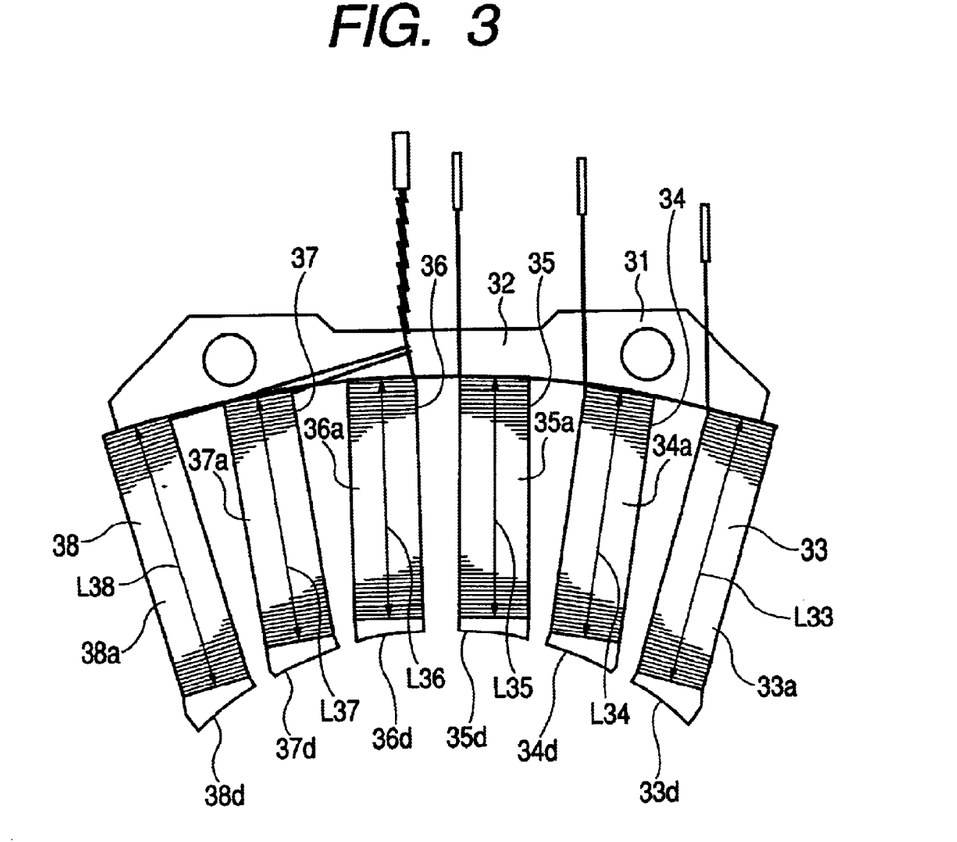
FIG. 3 is a plan view showing a stator 3 in FIG. 1.

FIG. 3 is a plan view showing the stator 3 in FIG. 1.

In the stator 3, as shown in FIGS. 1, 2, and 3, there are formed: a yoke 32; and coils 33*a* to 38*a* respectively wound around magnetic pole tooth 33 to 38 formed on a stator core 31 comprising the six magnetic pole teeth 33, 34, 35, 36, 37, and 38 coupled by the yoke. The stator 3 is attached to the chassis 1 by the yoke 32, and the coils 33*a* to 38*a* are positioned to fit in a notch 11 of the chassis 1 provided from a lower portion of rotation of the rotor 2 to a side thereof.

The notch 11 is provided from a position where the stator core 31 is attached to the chassis 1 to a lower position of rotation position of the magnet 25 of the rotor 2 in a shape in which the coils 33*a* to 38*a* can be housed in the magnet 25. The shape of the notch 11 is set to such an extent that the coils 33*a* to 38*a* can be housed, taking positional relationships with notches 12, 13, and 14 described later and the strength of the chassis 1 into account.

The contour shape of the notch 11 in the lower position of rotation position of the rotor 2 is set to be symmetric with the contour shape of a notch 12 described later in the lower position of rotation position of the rotor 2 with respect to the rotation center 21. This shape setting and the setting of the shapes of the stator core 31 and the magnetic balancer 7 described later allow a magnetic flux from the magnet 25 to enter the bottom of the chassis 1, thereby making it possible to set a downward thrust force acting on the rotor 2 in the direction of a line passing through the stator 3 and the magnetic balancer 7.

In the same way, the contour shapes of the notches 13 and 14 in a lower position of rotation position of the rotor 2 are set to be symmetric with each other with respect to the rotation center 21. This shape setting and the setting of the shapes of the magnetic shield 8 and magnetic balancer 9 described later allow a magnetic flux from the magnet 25 to enter the bottom of the chassis 1, thereby making it possible to set a downward thrust force acting on the rotor 2 in the direction of a line passing through the magnetic shield 8 and the magnetic balancer 9.

Next, the shape of the stator core 31 will be described.

Figure 4:
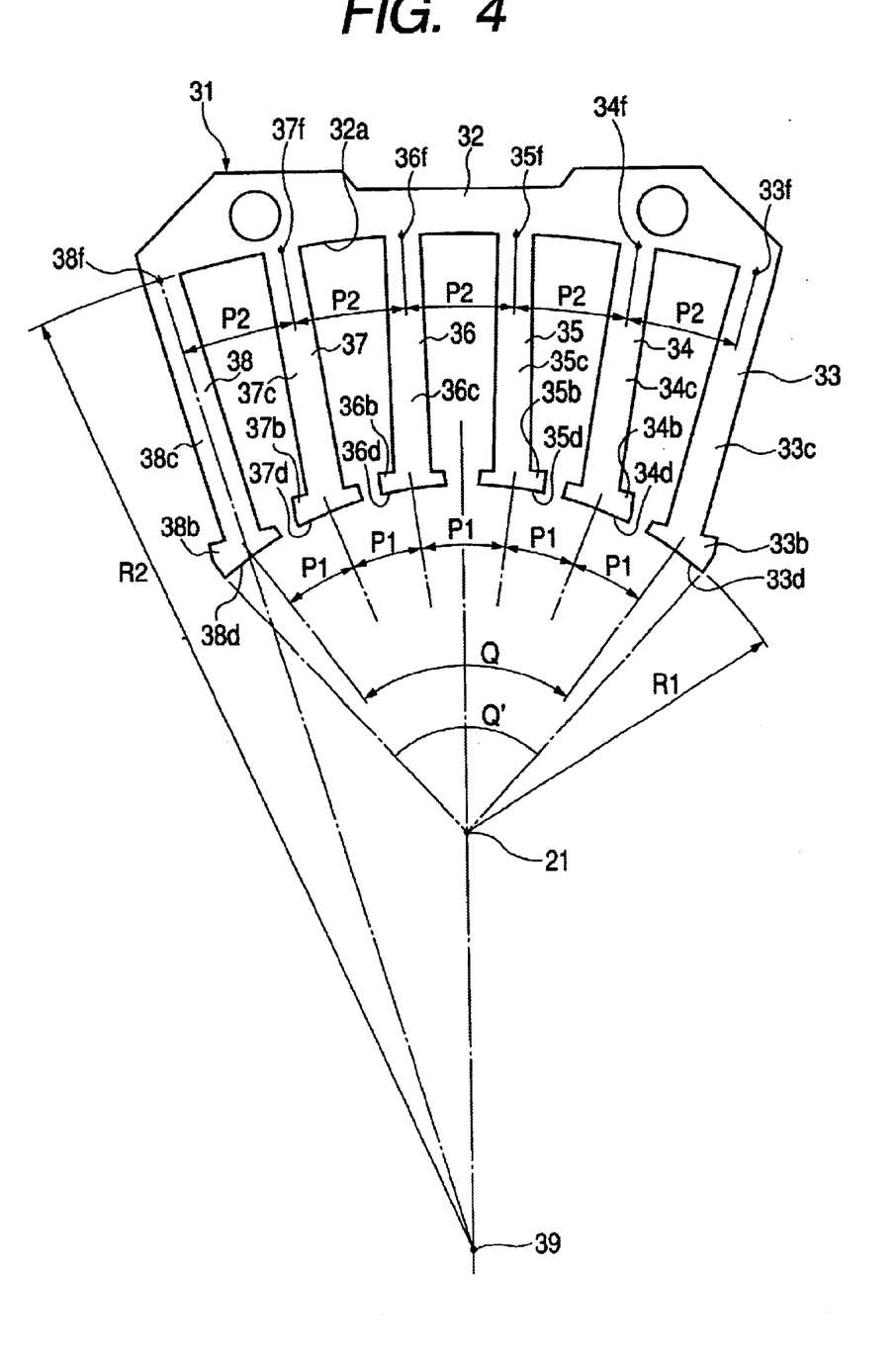
FIG. 4 is a plan view showing a stator core 31 in FIG. 1.

FIG. 4 is a plan view showing the stator core 31 in FIG. 1.

The stator core 31 is constructed from a silicon steel plate, and as shown in FIGS. 1 to 4, the magnetic pole teeth 33 to 38 are respectively provided with tips 33*b* to 38*b* provided extensionally to the rotor 2 beyond the coils 33*a* to 38*a*, and windings 33*c* to 38*c* in which the coils 33*a* to 38*a* are formed. The windings 33*c* to 38*c* are respectively set to an equal width throughout their length. The tips 33*b* to 38*b* are formed wider than the windings 33*c* to 38*c* and provided with rotor facing faces 33*d* to 38*d*, which are provided in an arc shape when viewed on a plan view so as to face the magnet 25 of the rotor 2 at an almost equal interval.

The stator core 31 has the tips 33*b* to 38*b* formed at lower positions in comparison with the magnet 25 of the rotor 2, as shown in FIG. 2. In other words, the central position of the tips 33*b* to 38*b* in height direction (a direction along the rotation axis line of the rotor 2) is closer to the bottom of the chassis 1 than the central position of the magnet 25 in height direction. At the same time, the coils 33*a* to 38*a* are within the notch 11 of the chassis 1.

The difference between the central positions of the tips 33*b* to 38*b* and the magnet 25 in height direction, like the height setting of the magnetic balancer 7 described later, is set to set a downward thrust load (toward the chassis 1) for maintaining the rotation stability of the rotor 2.

In the magnetic pole teeth 33 to 38, as shown in FIGS. 1, 3, 4, and 5, the rotor facing faces 33*d* to 38*d* at their tip are set in an arc shape of radius R1 so that they are at an equal distance from a point matching the rotation center 21 of the rotor 2. Pitches of the rotor facing faces 33*d* to 38*d* in a circumferential direction are respectively equally set. The pitch P1 of the rotor facing faces 33*d* to 38*d*, which is an interval between the central positions 33*g* to 38*g* of adjacent rotor facing faces 33*d* to 38*d* in the circumferential direction, is represented by an angle at the rotation center 21. The pitch P1 of the rotor facing faces 33*d* to 38*d* is set to, e.g., 15 degrees.

The interval between the central positions in the circumferential direction of the rotor facing face 33*d* and the rotor facing face 38*d* at both ends is represented by an angle at the rotation center 21. The value Q of the angle is set so that a central angle is 75 degrees at a point matching the rotation center 21 of the rotor 2.

In the yoke 32, a face 32*a* of a side at which the magnetic pole teeth 33 to 38 are connected, that is, a side opposite to the rotor 2, is set in a arc shape, and the face 32*a*, as shown in FIG. 4, is set in an arc shape of radius R2 with a point 39 at center wherein the point 39 is more distant than the point matching the rotation center 21 of the rotor 2 from the stator 3. The respective base centers 33*f* and 38*f* of the magnetic pole teeth 33 and 38 connected to the face 32*a* are respectively set at an equal position from the rotation center 21. The respective base centers 34*f* and 37*f* of the magnetic pole teeth 34 and 37 are respectively set at an equal position from the rotation center 21. The respective base centers 35*f* and 36*f* of the magnetic pole teeth 35 and 36 are respectively set at an equal position from the point 21. In other words, the shape of the stator core 31 is set to be symmetric with respect to a line L1 passing through the rotation center 21 and the point 39.

In the magnetic pole teeth 33 to 38, as shown in FIG. 4, the pitches P2 of the base centers 33*f* to 38*f* are respectively equally set. The pitch P2 of the base centers 33*f* to 38*f*, which is an interval between the central positions of adjacent magnetic pole teeth 33 to 38 in the circumferential direction along the face 32*a* at the base of the magnetic pole teeth 33 to 38, is represented by an angle at the point 39. The pitch P2 of the base centers 33f to 38f is set to a value smaller than the pitch P1 of the rotor facing faces 33d to 38d, e.g., 7 degrees.

The pitch P2 of the base centers 33f to 38f is set so that at least one of angles formed by directions in which adjacent magnetic pole teeth 33 to 38 extend is smaller than an angle formed by lines each connecting one of the rotor facing faces 33d to 38d of adjacent magnetic pole teeth 33 to 38, and the rotation center 21 of the rotor 2. In other words, the respective base centers 33f to 38f of the magnetic pole teeth 33 to 38 are connected with the central positions 33g to 38g of the rotor facing faces 33d to 38d in the circumferential direction to form lines, and a point of intersection of extensions of the formed lines is defined as the point 39. At this time, the value P2 of at least one of angles formed by the extensions at the point 39 is set to be smaller than an angle P1 formed by lines each connecting one of the central positions 33g to 38g of the rotor facing faces 33d to 38d in the circumferential direction and the rotation center 21.

The point 39 is set to be outside the rotor 2.

In the magnetic pole teeth 33 to 38, the windings 33c to 38c having the same width in the direction in which the magnetic pole teeth 33 to 38 extend, as shown in FIG. 4, are provided to extend onto lines passing through the base centers 33f to 38f and the point 39. In the drawing, there is shown a relationship between the winding 38c in the magnetic pole teeth 38, and a line passing through the base center 38f and the point 39.

By setting the pitches P1 and P2 in this way, the lengths L33 to L35 and L36 to L38 of the windings 33c to 38c in the magnetic pole teeth 33 to 38 are set to be different from each other. That is to say, as shown in FIGS. 3 and 4, the length L33 of the winding 33c is set to be longer than the length L34 of the winding 34c, the length L34 of the winding 34c is set to be longer than the length L35 of the winding 35c, the length L33 of the winding 33c is set to be equal to the length L38 of the winding 38c, the length L34 of the winding 34c is set to be equal to the length L37 of the winding 37c, and the length L35 of the winding 35c is set to be equal to the length L36 of the winding 36c. In other words, the following relation is satisfied:

$$L33=L38>L34=L37>L35=L36.$$

In the coils 33a to 38a, the numbers of turns N33 to N35 and N36 to N38 of their respective windings are set to be different from each other. The number of turns N33 to N38 can be respectively set in proportion to the lengths L33 to L38 of the windings 33c to 38c. For example, the number of turns N33 is set to be larger than the number of turns N34, the number of turns N34 is set to be larger than the number of turns N35, the number of turns N33 is set to be equal to the number of turns N38, the number of turns N34 is set to be equal to the number of turns N37, and the number of turns N35 is set to be equal to the number of turns N36. In other words, the following relation is satisfied:

$$N33=N38 \geq N34=N37 \geq N35=N36.$$

The coils 33a to 38a are respectively formed to produce one of three phases (U, V, and W phases) for the rotor 2 comprised of 16 poles so that the coil 33a is set to the U phase, the coil 34a to the W phase, the coil 35a to the V phase, the coil 36a to the U phase, the coil 37a to the W phase, and the coil 38a to the V phase.

Accordingly, the sum Nu of the numbers of turns of the U phase is N33+N36, the sum Nv of the numbers of turns of the V phase is N35+N38, and the sum Nw of the numbers of turns of the W phase is N34+N37, and Nu, Nv, and Nw are set equal to each other. In short, the following relation is satisfied: Nu=Nw=Nv. Thereby, torque for the rotor 2 in the three phases (U, V, and W phases) can be set equal.

By the above-described configuration, the stator 3 may be at one side of the rotor 2; that is, the stator may be positioned so that a central angle Q is within 180 degrees, preferably within 90 degrees at a point matching the rotation center 21 of the rotor 2 in a face parallel to the rotation face of the rotor 2.

Since the stator 3 is thus placed within a central angle of 180 degrees or less, in comparison with the case where a stator is provided in the entire circumference of the rotor 2, the space of a stator core when viewed on a plan view can be desirably reduced more than half. If the stator 3 is placed within the central angle 90 degrees, more desirably, the space of the stator core can be further reduced.

FIG. 5 is a schematic plan view showing a relationship between the magnet 25 and the magnetic pole teeth 33 to 38 in FIG. 1.

The stator 3 and the rotor 2, as shown in FIG. 5, are positioned so that the rotor facing faces 33d to 38d face the rotor 2, while a relationship between the magnetic pole teeth 33 to 38 and the magnet 25 is as described below.

In other words, as described previously, in the circumferential direction of the rotor 2, the magnetic poles 25n, 25s, and so forth are provided so that they have a pitch of 22.5 degrees with respect to the rotation center 21. This pitch is indicated by P3 in FIG. 5. On the other hand, as described previously, the pitch P1 of the rotor facing faces 33d to 38d in the circumferential direction is set to, e.g., 15 degrees. In other words, each one of the magnetic poles 25n, 25s, and so forth of the rotor 2 corresponds to, for example, one magnetic pole tooth 33 and a half of one magnetic pole tooth 34, that is, one and half of the magnetic pole teeth 33 to 38. In the drawing, the magnetic pole teeth 37 and 38 are omitted.

That is, the respective magnetic pole placements of the stator 3 and the rotor 2, as shown in FIG. 5, are provided so that, when the central position (tip center) 33g of the rotor facing face 33d of the magnetic pole teeth 33 in the circumferential direction is in a position opposite to a boundary position 25a between a magnetic pole 25s0 and a magnetic pole 25n1, the central position 34g of the rotor facing face 34d of the adjacent magnetic pole teeth 34 in the circumferential direction comes to a position opposite to a position 25b that is two-thirds the pitch P3 of the magnetic pole 25n1 away from the magnetic pole 25s0 side. At the same time, the central position 35g of the rotor facing face 35d of the next magnetic pole teeth 35 in the circumferential direction comes to a position opposite to a position 25c that is one-third the pitch P3 of the magnetic pole 25s1 away from the magnetic pole 25n1 side. The central position 36g of the rotor facing face 36d of the magnetic pole teeth 36 in the circumferential direction is set to come to a position opposite to a boundary position 25d between the next magnetic pole 25s1 and the next magnetic pole 25n2 thereof.

Figure 7:
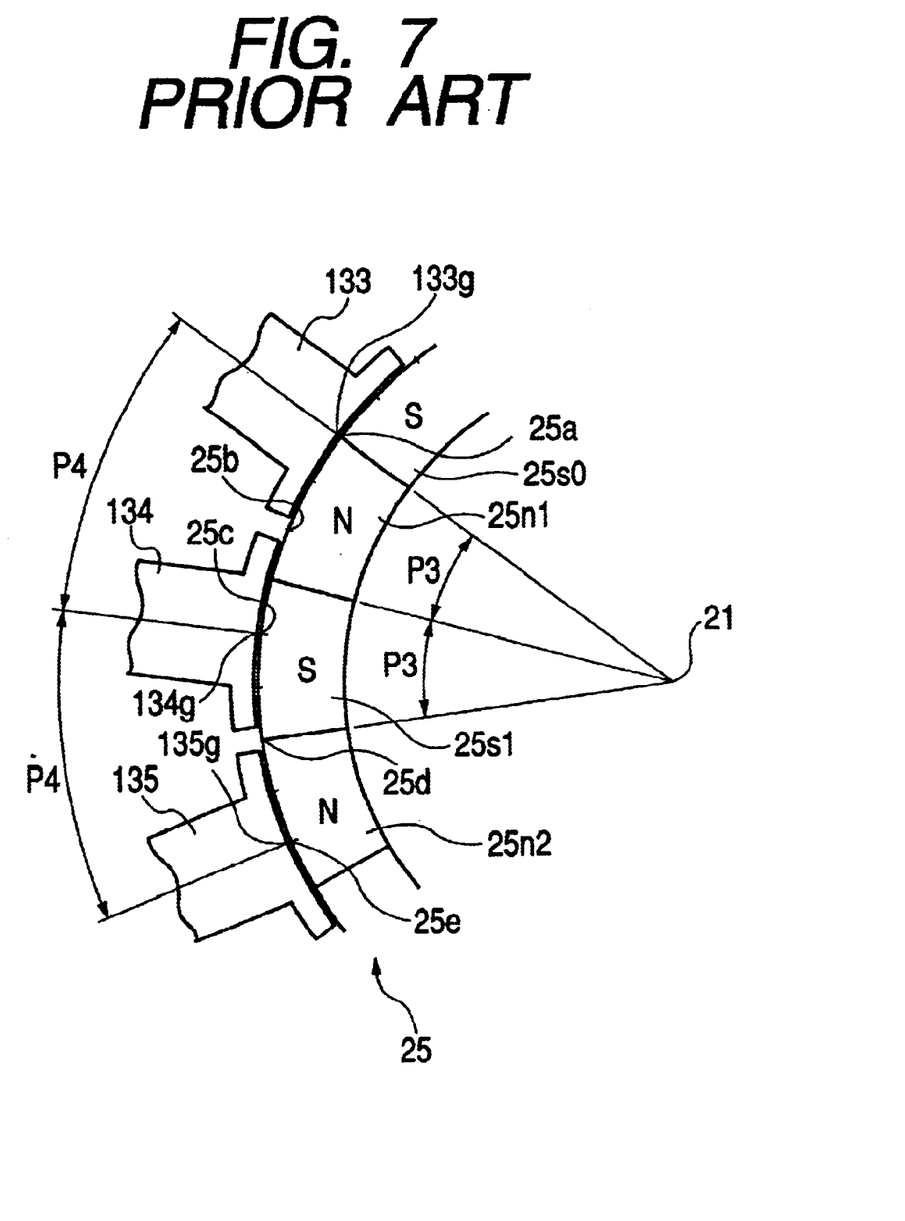
FIG. 7 is a schematic plan view showing a relationship between the magnet 25 and magnetic pole teeth 133 to 136 in a conventional motor.

A description will be made of the shapes of the stator 3 and the rotor 2 in a three-phase motor. FIG. 7 is a schematic plan view showing a relationship between the magnet 25 and magnetic pole teeth 133 to 136 in a conventional motor. For simplicity, magnetic pole teeth other than three magnetic pole teeth are omitted, the magnet has the same structure as that of the present embodiment shown in FIG. 5, and identical reference numerals are assigned to identical components, whose description is omitted.

In a conventional three-phase inner rotor motor shown in FIG. 7, in an electrical angle set as 360 degrees for a pair of magnetic poles 25n and 25s of the rotor, U, V, and W phases are set so that the magnetic pole teeth 133, 134, and 135 are placed so as to have a phase difference of electrical angle 120 degrees.

Specifically, like FIG. 5, for the magnet 25, when the central position 133g of the rotor facing face of a magnetic pole teeth 133 in the circumferential direction is in a position opposite to a boundary position 25a between a magnetic pole 25s0 and a magnetic pole 25n1, the central position 134g of the rotor facing face of a magnetic pole teeth 134 in the circumferential direction is set so as to come to a position opposite to a position 25c that is one-third the pitch P3 of the magnetic pole 25s1 away from the magnetic pole 25n1 side. At the same time, the central position 135g of the rotor facing face of a magnetic pole teeth 135 in the circumferential direction is set so as to come to a position opposite to a position 25d that is two-thirds the pitch P3 of the magnetic pole 25n2 away from the magnetic pole 25s1 side.

In this way, in the conventional three-phase inner rotor motor shown in FIG. 7, the three magnetic pole teeth 133, 134, and 135 are respectively placed at a pitch P4 of, e.g., 30 degrees with respect to the rotation center 21. That is, if magnetic pole teeth are provided in the entire circumference of the rotor 2 at the pitch P4, a stator having 12 poles is formed.

On the other hand, in the inner rotor motor of the present embodiment, the magnetic pole teeth 133, 134, and 135 are respectively set to U, V, and W phases so as to have a phase difference of electrical angle 120 degrees; the coil 33a is set to produce the U phase, the coil 34a to produce the W phase, and the coil 35a to produce the V phase, the coil 36a to produce the U phase, the coil 37a to produce the W phase, and the coil 38a to produce the V phase.

A pitch of the rotor facing faces 33d to 38d in the magnetic pole teeth 33 to 38 is set to, e.g., 15 degrees. Accordingly, in the present embodiment, if magnetic poles are provided in the entire circumference of the rotor 2 at the pitch P1, a stator having 24 poles will be formed.

For this reason, in the present embodiment, more magnetic pole teeth than the number of magnetic poles of the rotor 2 are placed per unit angle at a central angle at the rotation center 21. Specifically, in the present embodiment, the angle density of the magnetic pole teeth 33 to 38 for a central angle of the rotation center 21 is set to be larger than that of the magnetic poles 25n and 25s of the rotor 2. Conversely, in the conventional three-phase inner rotor motor shown in FIG. 7, fewer magnetic pole teeth than the number of magnetic poles of the rotor are placed per unit angle at a central angle for the rotation center 21. Specifically, in the conventional three-phase inner rotor motor shown in FIG. 7, the angle density of the magnetic pole teeth 133 to 138 for a central angle of the rotation center is set to be smaller than that of the magnetic poles 25n and 25s of the rotor.

Therefore, in the conventional three-phase inner rotor motor shown in FIG. 7, to provide, e.g., six magnetic pole teeth requires a range of 120 degrees as a central angle in the rotation center 21 of the rotor 2, requiring more stator space.

Moreover, in the case where magnetic pole teeth 133, 134, and 135 are provided on lines passing through the rotation center 21 and the central positions 133g, 133g, 135g, and so forth of the rotor facing faces in the circumferential direction, the length of the yoke in the circumferential direction becomes longer than that in the case where they are provided on lines passing through the point 39 set more distant than the rotation center 21 from the stator 3 as in the present embodiment. As a result, the yoke space when viewed on a plan view is not reduced, and the space of the stator core 31 cannot be sufficiently reduced.

In a position opposite to the stator 3 across the rotor 2, the magnetic balancer 7 is provided to provide a magnetic balance with the stator 3 for the rotor 2.

Plural magnetic balancers 7, as shown in FIGS. 1 and 2, contact the notch 12 provided at a lower rotation position of the rotor 2 of the chassis 1 and are integrated with the bottom of the chassis 1, rise erectly from the bottom of the chassis 1, and are provided in the vicinity of the rotation position of the rotor 2 in opposed relation with the circumferential face of the magnet 25 of the rotor 2.

The magnetic balancers 7 are comprised of six magnetic balancer parts 71 to 76 correspondingly to the rotor facing faces 33d to 38d of the stator 3, and these parts are placed so that their respective rotor facing faces 71a to 76a are point-symmetrical with the rotor facing faces 33d to 38d of the magnetic pole teeth 33 to 38 with respect to the rotation center 21 of the rotor.

Specifically, in the magnetic balancer part 71, the rotor facing face 71a is provided so as to be symmetrical with the rotor facing face 33d with respect to the rotation center 21. In the magnetic balancer part 72, the rotor facing face 72a is provided so as to be symmetrical with the rotor facing face 34d with respect to the rotation center 21. Likewise, the rotor facing faces 73a and 35d, the rotor facing faces 74a and 36d, the rotor facing faces 75a and 37d, and the rotor facing faces 76a and 38d are respectively provided so as to be symmetrical with each other with respect to the rotation center 21.

This is done to balance a magnetic influence from the stator 3 on the rotor 2 by the shape of the magnetic balancers 7 and keep a magnetic balance for the rotor 2 symmetrical with respect to the rotation center 21.

To be more specific, the rotor facing faces 71a to 76a are set in an arc shape of radius R1' so that they are at an equal distance from a point 21 matching the rotation center of the rotor 2. Although the radius R1' is set to be larger than the radius R1 set for the rotor facing faces 33d to 38d, it is set taking the height of the magnetic balancers 7 described later into account. The pitches of the rotor facing faces 71a to 76a are set to be equal to each other, e.g., 15 degrees, like the pitch P1 of the rotor facing faces 33d to 38d.

The lengths of the rotor facing faces 71a to 76a in the circumferential direction are respectively set to correspond to the lengths of the rotor facing faces 33d to 38d of the magnetic pole teeth 33 to 38 across the rotation center 21 of the rotor.

In other words, in the magnetic balancer part 71, the length of the rotor facing face 71a in the circumferential direction is set to be equal to the length of the rotor facing face 33d in the circumferential direction, and in the magnetic balancer part 72, the length of the rotor facing face 72a in the circumferential direction is set to be equal to the length of the rotor facing face 34d in the circumferential direction. Likewise, in the magnetic balancer part 73, the length of the rotor facing face 73a in the circumferential direction is set to be equal to the length of the rotor facing face 35d in the circumferential direction; in the magnetic balancer part 74, the length of the rotor facing face 74a in the circumferential direction is set to be equal to the length of the rotor facing face 36d in the circumferential direction; in the magnetic balancer part 75, the length of the rotor facing face 75a in the circumferential direction is set to be equal to the length of the rotor facing face 37d in the circumferential direction; and in the magnetic balancer part 76, the length of the rotor facing face 76a in the circumferential direction is set to be equal to the length of the rotor facing face 38d in the circumferential direction.

The magnetic balancers 7 are provided at a lower position than the rotor 2. In other words, the central position of the magnetic balancers 7 in a height direction is set to be lower than the central position of the magnet 25 of the stator 2 in a rotation axis direction. The magnetic balancer parts 71 to 76 are set to almost equal height and set to be lower than the upper face 26 of the magnet 25 of the rotor 2. Or, the upper ends 71b to 76b of the magnetic balancers 7 are set to be closer to the bottom of the chassis 1 than the upper face 26 of the magnet 25 of the rotor 2.

A difference between the height of the magnetic balancers 7, that is, the upper ends 71b to 76b of the magnetic balancer parts 71 to 76, and the upper face 26 of the magnet 25 is provided by setting the central position of a difference in the height direction between the tips 33b to 38b and the magnet 25 and a downward thrust load (toward the chassis 1) for maintaining the rotation stability of the rotor 2.

The setting of the shape of the above-described magnetic balancers 7 will be described.

As shown in FIG. 2B, force F3 acts between the rotor 2 and the stator 3, and at the same time, force F7 acts between the rotor 2 and the magnetic balancers 7. The force F3 acts more intensively slantingly to the bottom of the chassis 1 than toward the rotation plane of the rotor 2. This is because the rotor 2 experiences the force F3 in the direction of the tips 33b to 38b provided at a lower position than the magnet 25 of the rotor 2. The force F7 acts more intensively slantingly to the bottom of the chassis 1 than toward the rotation plane of the rotor 2. This is because the rotor 2 experiences the force F3 in the direction of the magnetic balancers 7 provided at a lower position than the magnet 25 of the rotor 2.

The forces F3 and F7 produce rotation moment in the rotor 2 with respect to the bearings 22, and the forces F3 and F7 must satisfy the following expression (1) for stable rotation without the rotor 2 tilting.

$$F7t(RA-RB)<F3t(RA+RB)$$

$$F3t(RA-RB)<F7t(RA+RB) \quad (1)$$

where, as shown in FIGS. 2A and 2B, $F3t=F3 \cos \theta_1$ (vertical component of F3)

$F7t=F7 \cos \theta_2$ (vertical component of F7)

RA: Radius of a circumferential face of the magnet 25 for the rotation center 21

RB: Rotation radius of the bearing 22 for the rotation center 21

By this arrangement, the forces F3 and F7 help to apply a thrust force to the rotor 2 to stabilize the rotation of the rotor 2 by the sum of forces F3t and F7t in the rotation axis direction of the rotor 2. In short, the rotor 2 is thrust to the bottom of the chassis 1 from the marginal part thereof.

At this time, between the notches 11 and 14, the notches 14 and 12, the notches 12 and 13, and the notches 13 and 11, a magnetic flux from the magnet 25 respectively enters the bottom of the chassis 1, thereby exerting a downward thrust force on the rotor 2.

Therefore, the forces F3 and F7 are set to such an extent that the downward force to the rotor 2 stabilizes the rotation of the rotor 2 and the drivability of the rotor 2 is prevented from decreasing due to friction or other influences caused by an increased thrust force in the rotation axis of the rotor 2.

At the same time, the forces F3 and F7 are set so that force 7p is larger than force 3p in a direction vertical to the rotation axis of the rotor 2, that is, a direction parallel to the bottom of the chassis 1. To be more specific, as shown in FIG. 2B, the leftward force F3p is set to be smaller than the rightward force F7p. By this arrangement, a rightward force F2 shown in FIG. 2B, that is, a force in a direction from the stator 3 side to the magnetic balancers 7 side, is applied to the rotation axis 21 of the rotor 2, stabilizing the rotation axis of the rotor 2.

To set the forces F3 and F7 as described above, the following parameters are used:

Size of the rotor facing faces 33d to 38d;

Distance between the rotor facing faces 33d to 38d and the circumferential face of the magnet 25;

Height positions of the rotor facing faces 33d to 38d and the magnet 25;

Size of the rotor facing faces 71a to 76a;

Distance between the rotor facing faces 71a to 76a and the circumferential face of the magnet 25; and Height positions of the rotor facing faces 71a to 76a and the magnet 25.

An optimum state is set by combining these parameters.

The magnetic head 4 comprises a first head 41 and a second head 42, vertically disposed in opposed relation to each other, for reading and writing magnetic signals from a disk, which are secured to a head carriage 43. The first head 41 and second head 42 are position-controlled by the position controller 5.

The position controller 5, as shown in FIG. 1, includes a stepping motor 51 for feeding the head carriage 43, and the stepping motor 51 is held in a rearward central portion of the chassis 1 and is used as a driving source for driving the head carriage 43 back and forth. The output shaft of the stepping motor 51 is formed by a lead screw rod 52 having spiral V-character grooves and extending in a back-and-forth direction and is supported at the tip thereof by a bearing. A guide rod 53 is provided in parallel to the lead screw rod 52, is held in a rearward central portion of the chassis 1, and is configured to guide the head carriage 43 described later back and forth.

The head carriage 43 has a needle pin 54 projecting slantingly rearward and a plate spring for pressing the needle pin against the V-character grooves of the lead screw rod 52. The head carriage 43 is penetrated by the guide rod 53 for free movement and is provided in an upper position of the chassis 1. The magnetic head 41 for reading information recorded on a disk is held at the tip of the head carriage 43, and in a rearward upper portion of the magnetic head 41, a head arm 55 having the magnetic head 42 corresponding to the magnetic head 41 is mounted to be freely swingable via an elastic member. The head arm 55 is energized for turning by a torsion spring 56 in a direction in which the magnetic head 42 approaches the magnetic head 41, and is integrally provided at the margin of one side thereof with an arm turning control stopper projecting sideways.

On the board 6 are provided the position controller 5, and chips 61, a capacitor 62, and the like as a controller that controls the driving of the inner rotor motor.

At the magnetic head 4 side of the rotor 2 is provided a magnetic shield 8 for shielding a magnetic flux to the magnetic heads 41 and 42 from the magnet 25.

Figure 6:
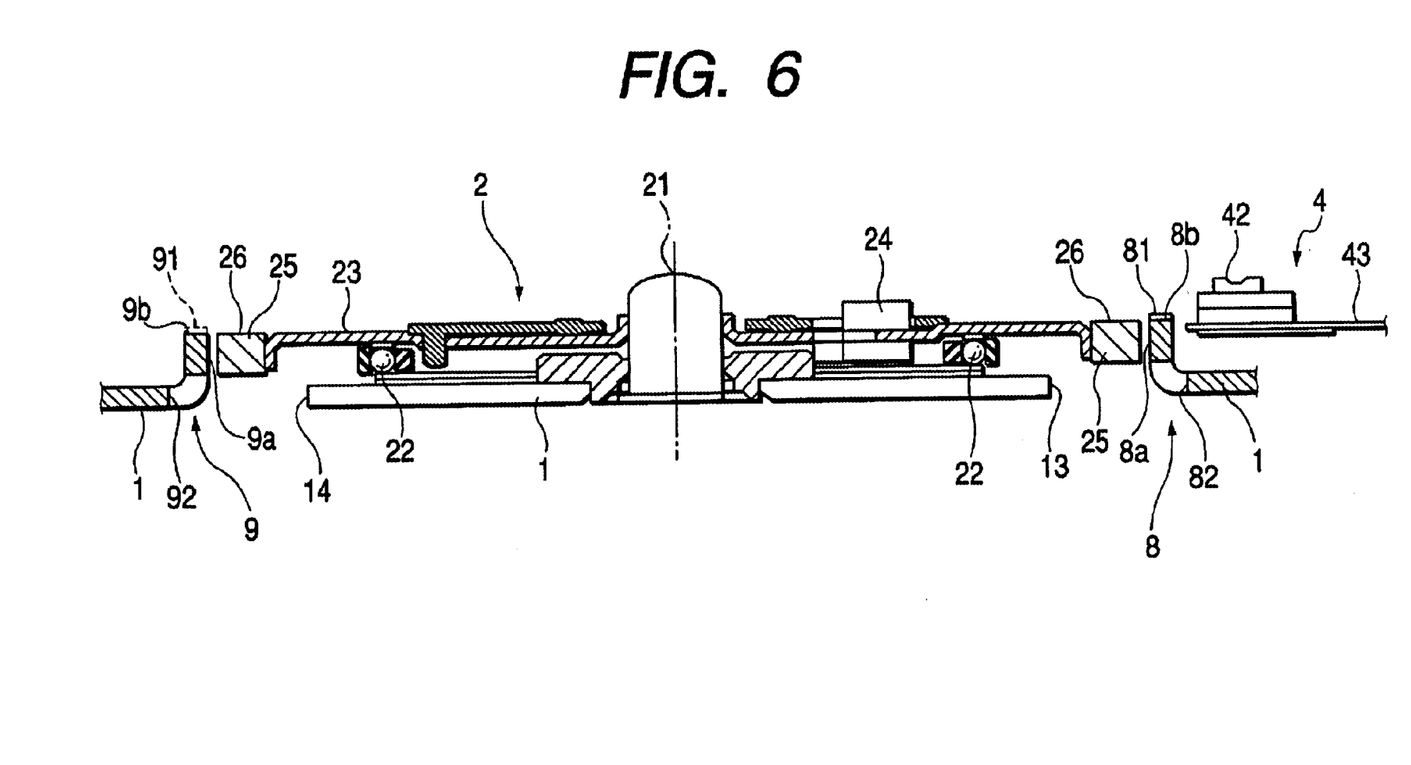
FIG. 6 is a diagram showing a cross section of a magnetic shield of the inner rotor motor of FIG. 1, taken along the line VI—VI.

FIG. 6 is a diagram showing a cross section of the magnetic shield of the inner rotor motor of FIG. 1, taken along the line VI—VI.

The magnetic shield 8, as shown in FIGS. 1 and 6, contacts a notch 13 provided at a lower rotation position of the rotor 2 of the chassis 1 and is integrated with the bottom of the chassis 1, rises erectly from the bottom of the chassis 1, and is provided in the vicinity of the rotation position of the rotor 2 in opposed relation with the circumferential face of the magnet 25 of the rotor 2.

The magnetic shield 8 when viewed on a plan view is linearly constructed and its length is set so that the magnet 25 of the rotor 2 is hidden when the rotor 2 is viewed from the magnetic head 42. In other words, its length may be such that a magnetic flux from the magnet 25 can be shielded to avoid exerting a bad influence on the operation of the magnetic heads 41 and 42.

The linear magnetic shield 8 is positioned to be the nearest to the rotor 2 at the central portion thereof, and the distance between a rotor facing face 8a thereof and the magnet 25 is the largest at both ends of the magnetic shield 8 and the shortest at the central portion thereof.

By this arrangement, even if the length of the magnetic shield 8 is different from a length corresponding to two adjacent magnetic poles 25n and 25s of the magnet 25 shown in FIG. 5, it can be prevented that a magnetic flux entering the magnetic shield 8 from the magnet 25 of the rotating rotor 2 increases or decreases abruptly. Consequently, since the magnetic flux can change smoothly up to a maximum value, the occurrence of cogging can be prevented. Therefore, a detent torque of the rotor 2 can be reduced.

A conceivable length of the magnetic shield 8 optimum to prevent the occurrence of cogging is a length almost equal to the length of two adjacent magnetic poles 25n and 25s of the magnet 25 shown in FIG. 5. However, if the length is set to be almost equal to the length of two adjacent magnetic poles 25n and 25s of the magnet 25 shown in FIG. 5, the notch 13 would become large to provide for the magnetic shield 8. As a result, the strength of the shield 1 might decrease.

Hence, if the length of the magnetic shield 8 is made shorter than the length of two adjacent magnetic poles 25n and 35s to prevent cogging and keep the strength of the chassis 1, it is necessary that a distance between the rotor facing face 8a of the magnetic shield 8 and the rotation face of the rotor 2 is set to increase or decrease smoothly as described above, whereby cogging can be prevented without reducing the strength of the chassis 1.

The upper end 8b of the magnetic shield 8 is set to be almost flush with the upper face 26 of the magnet 25 of the rotor 2 as shown in FIG. 6. The height of the rotor facing face 8a is set to be almost equal to the height of the magnet 25. Thereby, a magnetic flux from the magnet 25 can be shielded to avoid exerting an influence on the operation of the magnetic head 42. The magnetic shield 8 is formed to pull the magnet 25 only in horizontal direction, reducing a vertical load on the rotor 2.

That is, the setting of a shape of this portion makes it possible to set a vertical load on the rotor 2 as well.

In a position opposite to the magnetic shield 8 across the rotor 2, the magnetic balancer 9 is provided to provide a magnetic balance with the magnetic balancer 8 for the rotor 2.

The magnetic balancer 9, as shown in FIGS. 1 and 6, contacts a notch 14 provided at a lower rotation position of the rotor 2 of the chassis 1 and is integrated with the bottom of the chassis 1, rises erectly from the bottom of the chassis 1, and is provided in the vicinity of the rotation position of the rotor 2 in opposed relation with the circumferential face of the magnet 25 of the rotor 2.

The magnetic balancer 9 is constructed correspondingly to the magnetic shield 8 and is placed to be point-symmetrical with the magnetic shield 8 with respect to the rotation center 21 of the rotor.

In other words, the linear magnetic balancer 9 is set to be equal in length to the magnetic shield 8, and is positioned in relation to the magnet 25 of the rotor 2 so that it is the nearest to the rotor 2 at the central portion thereof, and the distance between a rotor facing face 9a thereof and the magnet 25 is the largest at both ends of the magnetic shield 9 and the shortest at the central portion thereof, just as the magnetic shield 8 does.

The upper end 9b of the magnetic shield 9 is set to be flush with the upper face 26 of the magnet 25 of the rotor 2 as shown in FIG. 6. Like the rotor facing face 8a of the magnetic shield 8, the height of the rotor facing face 9a is set to be equal to or greater than the height of the magnet 25.

On the chassis 1 at the bases of the magnetic shield 8 and the magnetic balancer 9 are provided through holes 82 and 92 for reducing stress that would exert an influence on the bottom of the chassis 1 when the magnetic shield 8, the magnetic balancer 9 and the chassis 1 are formed by press-bending. The through holes 82 and 92 may not be provided.

In this way, the magnetic balancer 9 is formed to be point-symmetrical with the magnetic shield 8 with respect to the rotation center 21 of the rotor 2, thereby balancing a magnetic influence from the magnetic shield 8 on the rotor 2 and keeping a magnetic balance for the rotor 2 symmetrical with respect to the rotation center 21.

On the respective upper ends 73b, 8b, and 9b of the magnetic balancer 7, the magnetic shield 8, and the magnetic balancer 9 are provided convex cartridge supports 77, 81, and 91 projecting upward from the upper face 26 of the magnet 25 of the rotor 2, as shown in FIGS. 1, 2, and 6. The cartridge supports 77, 81, and 91 are provided to support a disk cartridge of floppy disk or the like so as to prevent it from contacting rotating parts of the rotor 2 even if it is thermally deformed. Therefore, the upper ends of the cartridge supports 77, 81, and 91 are set to such a height as not to interfere with the disk rotation operation of the rotor 2 and such a height that the cartridge does not interfere with the rotation of the rotor.

In the inner rotor motor and disk unit of the present embodiment, the stator 3 is at one side of the rotor 2; that is, the stator 3 may be positioned so that a central angle Q is within 180 degrees, preferably within 90 degrees at a point 21 matching the rotation center of the rotor 2 in a face parallel to the rotation face of the rotor 2. With this construction, in comparison with the case where a stator is provided in the entire circumference of the rotor 2 as in a conventional inner rotor motor, the space of a stator core can be reduced more than half. As a result, costs for, e.g., a stator core constructed from a silicon steel plate, and costs of coil windings and the like can be reduced to reduce the costs of manufacturing the inner rotor motor.

At the same time, in comparison with the case where a stator is provided in the entire circumference of the rotor 2, a space required to mount a motor can be reduced in the interest of miniaturization, and the number of magnetic pole teeth can be reduced to achieve a light weight.

In the disk unit of the present embodiment, a space required to mount a motor can be reduced in the interest of miniaturization, and the number of magnetic pole teeth can be reduced to achieve a light weight.

In the inner rotor motor and disk unit of the present embodiment, the magnetic balancer 7 for providing a magnetic balance with the stator 3 for the rotor 2 is provided outside the circumference of the rotor 2. With this construction, even in the case where the stator 3 is provided only at one side of the rotor 2 and the rotor 2 is driven only in the side, a force acting on the rotor 2 can be made symmetrical in balance with respect to the rotation axis of the rotor 2, so that the rotation driving stability of the rotor 2 can be sufficiently maintained.

The magnetic balancer 7 of the present embodiment contacts the notch 12 provided at a lower rotation position of the rotor 2 of the chassis 1 and is integrated with the bottom of the chassis 1, and rises erectly from the bottom of the chassis 1. With this construction, when the chassis 1 constructed from, e.g., a galvanized steel plate is manufactured, by bending and raising the notch 12 portion to the rotor 2 mounting side by press-punching, the magnetic balancer 7 and the chassis 1 can be formed at the same time. With this construction, in comparison with the case where a different member is mounted as the magnetic balancer 7, the manufacturing process can be made simpler and material costs can be reduced, contributing to reduction in manufacturing costs.

Since the magnetic balancer 7 in the present embodiment comprises plural magnetic balancer parts 71 to 76 partitioned in the circumferential direction of the rotor 2, as described above, during the process of bending and raising the chassis 1 constructed from, e.g., a galvanized steel plate, when the curved rotor facing faces 71a to 76a are formed correspondingly to the outer circumferential face of the rotor 2, deformations in the bottom of the chassis 1 can be prevented and the manufacturing process can be made easier. Also, when a magnetic balance is set for the magnetic pole teeth 33 to 38 provided apart in the circumferential direction of the rotor 2, magnetic symmetry with the magnetic pole teeth 33 to 38 in the magnetic balancer parts 71 to 76 can be easily achieved.

In the magnetic balancer 7 in the present embodiment, the magnetic balancer parts 71 to 76 are placed symmetrically with the rotor facing faces 33d to 38d of the magnetic pole teeth 33 to 38 with respect to the rotation center 21 of the rotor 2, and the sum of the lengths of the rotor facing faces 71a to 76a in the outer circumference of the magnet 25 is set to be equal to the sum of the lengths of the rotor facing faces 33d to 38d of the magnetic pole teeth 33 to 38 in the outer circumference of the magnet 25. With this construction, the effects of the magnetic balancer 7 and the stator 3 on the rotor 2 can be more easily set to be symmetric with each other with respect to the rotation center 21 of the rotor 2.

In the magnetic balancer 7, in the magnetic balancer part 71, the rotor facing face 71a is provided to be symmetric with the rotor facing face 33d with respect to the rotation center 21, and the length of the rotor facing face 71a in the circumferential direction is set to be equal to the length of the rotor facing face 33d in the circumferential direction; in the magnetic balancer part 72, the rotor facing face 72a is provided to be symmetric with the rotor facing face 34d with respect to the rotation center 21, and the length of the rotor facing face 72a in the circumferential direction is set to be equal to the length of the rotor facing face 34d in the circumferential direction; in the magnetic balancer part 73, the rotor facing face 73a is provided to be symmetric with the rotor facing face 35d with respect to the rotation center 21, and the length of the rotor facing face 73a in the circumferential direction is set to be equal to the length of the rotor facing face 35d in the circumferential direction; in the magnetic balancer part 74, the rotor facing face 74a is provided to be symmetric with the rotor facing face 36d with respect to the rotation center 21, and the length of the rotor facing face 74a in the circumferential direction is set to be equal to the length of the rotor facing face 36d in the circumferential direction; in the magnetic balancer part 75, the rotor facing face 75a is provided to be symmetric with the rotor facing face 37d with respect to the rotation center 21, and the length of the rotor facing face 75a in the circumferential direction is set to be equal to the length of the rotor facing face 37d in the circumferential direction; and in the magnetic balancer part 76, the rotor facing face 76a is provided to be symmetric with the rotor facing face 38d with respect to the rotation center 21, and the length of the rotor facing face 76a in the circumferential direction is set to be equal to the length of the rotor facing face 38d in the circumferential direction. With this construction, in designing a magnetic circuit, the effects of the magnetic balancer 7 and the magnetic pole teeth 33 to 38 on the rotor 2 can be more easily set to be symmetric with each other.

Figure 8:
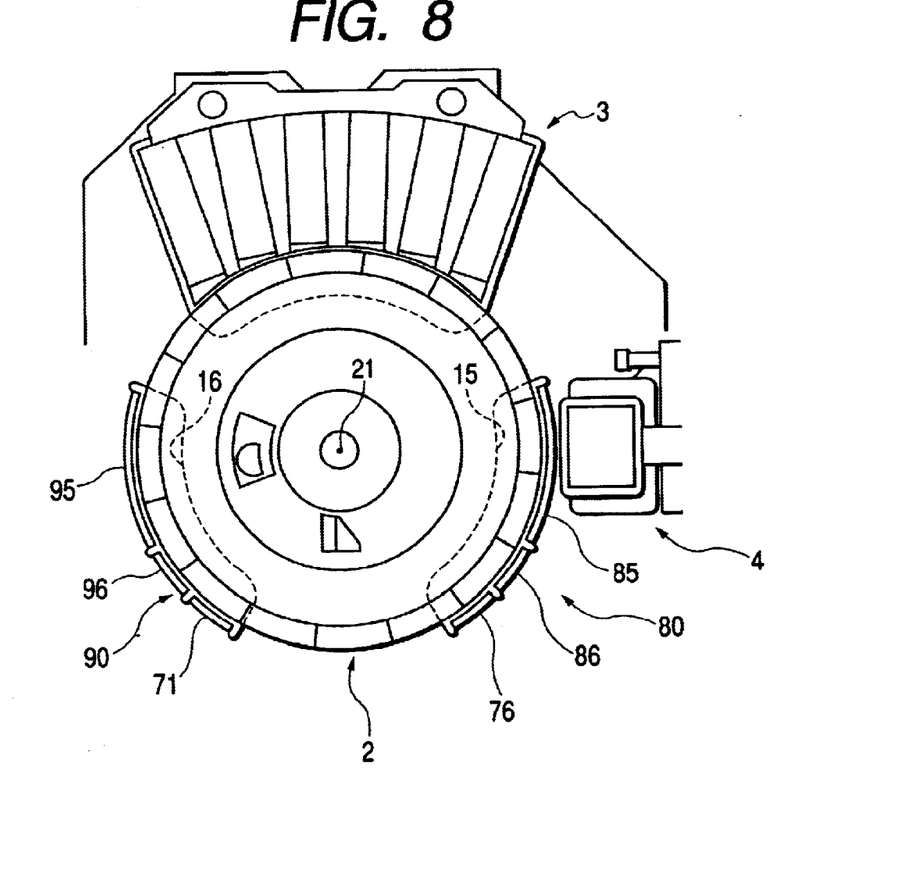
FIG. 8 is a plan view showing another embodiment of magnetic shields and magnetic balancers according to the present invention.

Although, in the present embodiment, the magnetic balancer 7, the magnetic shield 8, and the magnetic balancer 9 are constructed separately, as shown in FIG. 8, a magnetic balancer 80 also serving as a magnetic shield, and a magnetic balancer 90 also serving as a magnetic balancer for a magnetic shield may be formed.

The magnetic shield 80, as shown in FIG. 8, contacts a notch 15 provided at a lower rotation position of the rotor 2 of the chassis 1 and is integrated with the bottom of the chassis 1, rises erectly from the bottom of the chassis 1, and is provided in the vicinity of the rotation position of the rotor 2 in opposed relation with the circumferential face of the magnet 25 of the rotor 2.

The magnetic balancer 80 comprises plural parts: a magnetic shield part 85 provided correspondingly to the magnetic head 4, and magnetic balancer parts 86 and 76 provided adjacent thereto.

The length of the magnetic shield part 85 in the circumferential direction is set to be equal to the length of two adjacent magnetic poles 25n and 25s of the magnet 25, causing no cogging.

In a position opposite to the magnetic balancer 80 across the rotor 2, the magnetic balancer 90 is provided to provide a magnetic balance with the magnetic balancer 80 for the rotor 2.

The magnetic balancer 90, as shown in FIG. 8, contacts the notch 16 provided at a lower rotation position of the rotor 2 of the chassis 1 and is integrated with the bottom of the chassis 1, rises erectly from the bottom of the chassis 1, and is provided in the vicinity of the rotation position of the rotor 2 in opposed relation with the circumferential face of the magnet 25 of the rotor 2.

The magnetic balancer 90 is constructed correspondingly to the magnetic balancer 80 and has a magnetic balancer part 95 that is point-symmetrical with the magnetic shield 85 with respect to the rotation center 21 of the rotor.

In other words, the magnetic balancer part 95 is set to be equal in length to the magnetic shield 85 and is positioned in relation to the magnet 25 of the rotor 2 just as the magnetic shield 85 is.

The magnetic shields 80 and 90 are placed so that magnetic influences from them are synthesized to provide a magnetic balance with the stator 3 for the rotor 2.

Since the interval between the notches 15 and 16 is larger than the interval between the notches 12 and 13 or notches 12 and 14 shown in FIG. 1, a magnetic flux from the magnet 25 enters the bottom of the chassis 1, thereby exerting a large downward thrust force on the rotor 2 and setting the upper ends of the magnetic shields 80 and 90 to a higher position than the positions of the upper end of the magnetic shield 7.

Figure 9:
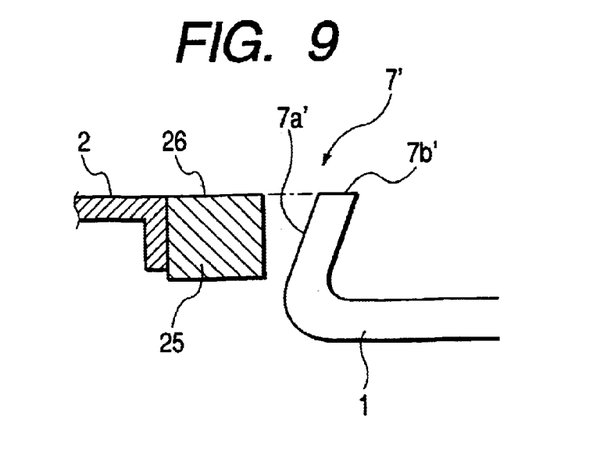
FIG. 9 is a cross section view showing another embodiment of a magnetic balancer according to the present invention.

As an inner rotor motor in which a slanting, downward force F7 as shown in FIG. 2B acts between the rotor 2 and the magnetic balancer 7, the upper end 7b' of a magnetic balancer 7' may be flush with the upper face 26 of the magnet 25 of the rotor 2, and a rotor facing face 7a' may be inclined in a direction that moves away from the outer circumference of the rotor 2 from a base thereof to a tip thereof. In short, since the distance between the rotor facing face 7a' and the outer circumference of the magnet 25 decreases from an upper side to a lower side, a slanting, downward force acts between the rotor 2 and the magnetic balancer 7'.

What is claimed is:

1. An inner rotor motor comprising:

a rotor having plural magnetic poles disposed in a circumferential shape; and a stator including a stator core having plural magnetic pole teeth that are outside a circumference of the rotor and face the rotor, a coil being wound around each of the magnetic pole teeth, wherein the stator is provided so that a central angle of the rotor with respect to the stator is in a range within 180 degrees; and the magnetic pole teeth are set so that a first angle defined by extensions of the centerlines of two adjacent magnetic pole teeth is smaller than a second angle defined by lines each connecting a tip center of one of the adjacent magnetic pole teeth center of one of the adjacent magnetic pole teeth and a rotation center of the rotor.

2. The inner rotor motor according to claim 1, wherein the magnetic pole teeth are provided so that at least one of points of intersection of extensions of lines each connecting a base center and a tip center of one of adjacent magnetic pole teeth is in a position opposite to the magnetic pole teeth with respect to the rotation center of the rotor.

3. The inner rotor motor according to claim 1, wherein the magnetic pole teeth are placed so that extensions of lines each connecting a base center and a tip center thereof intersect at an identical point.

4. The inner rotor motor according to claim 1, wherein the magnetic pole teeth are provided so that intervals between the base centers of adjacent magnetic pole teeth are equal to each other.

5. The inner rotor motor according to claim 1, wherein base centers of the magnetic pole teeth can be provided to be at an equal distance from a point opposite to the magnetic pole teeth with respect to the rotation center of the rotor.

6. The inner rotor motor according to claim 1, wherein the magnetic pole teeth are provided so that a value of at least one of angles each formed by extensions of adjacent magnetic pole teeth is 15 degrees or less.

7. The inner rotor motor according to claim 1, wherein six of the magnetic pole teeth are provided.

8. A disk unit including the inner rotor motor of claim 1.

* * * * *